Nov. 20, 1928.  
E. M. BROGDEN  
1,692,286  
PROCESS AND APPARATUS FOR FORMING A PROTECTIVE AND PRESERVATIVE  
COATING UPON FRUIT AND THE LIKE  
Original Filed April 27, 1923   2 Sheets-Sheet 2
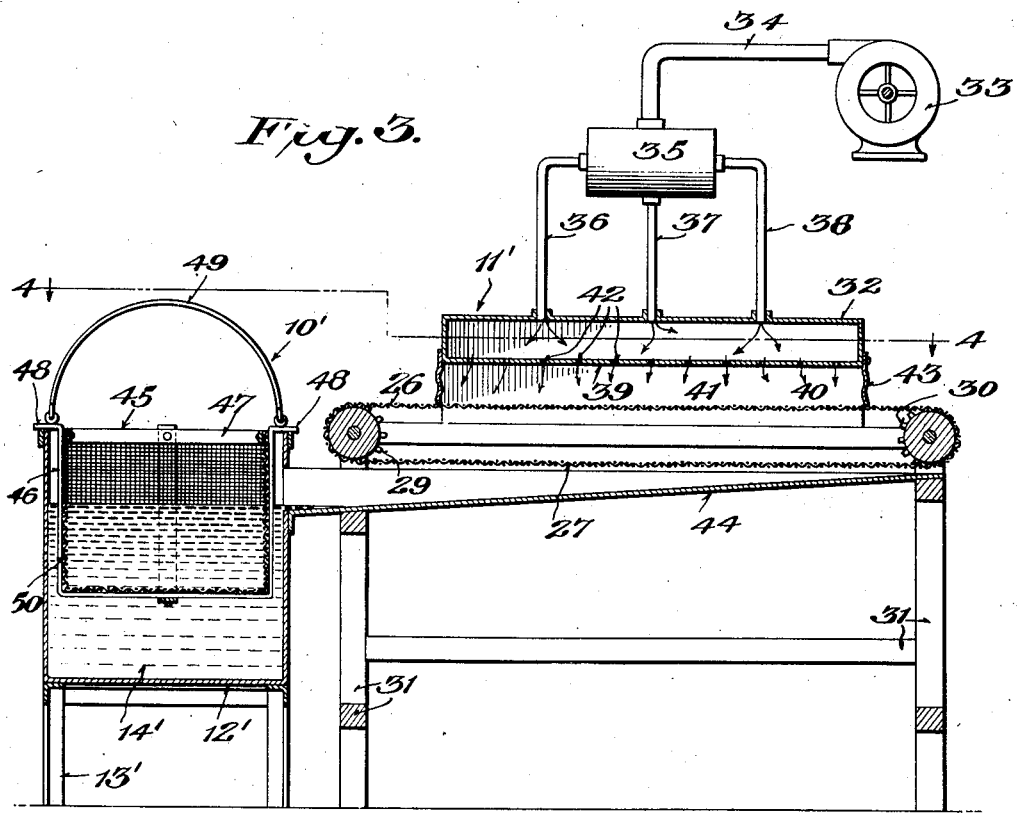
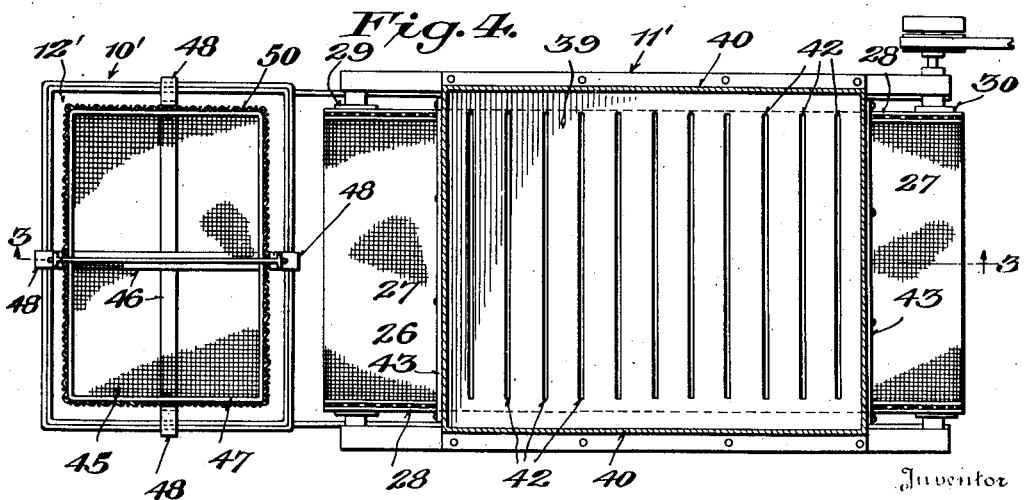

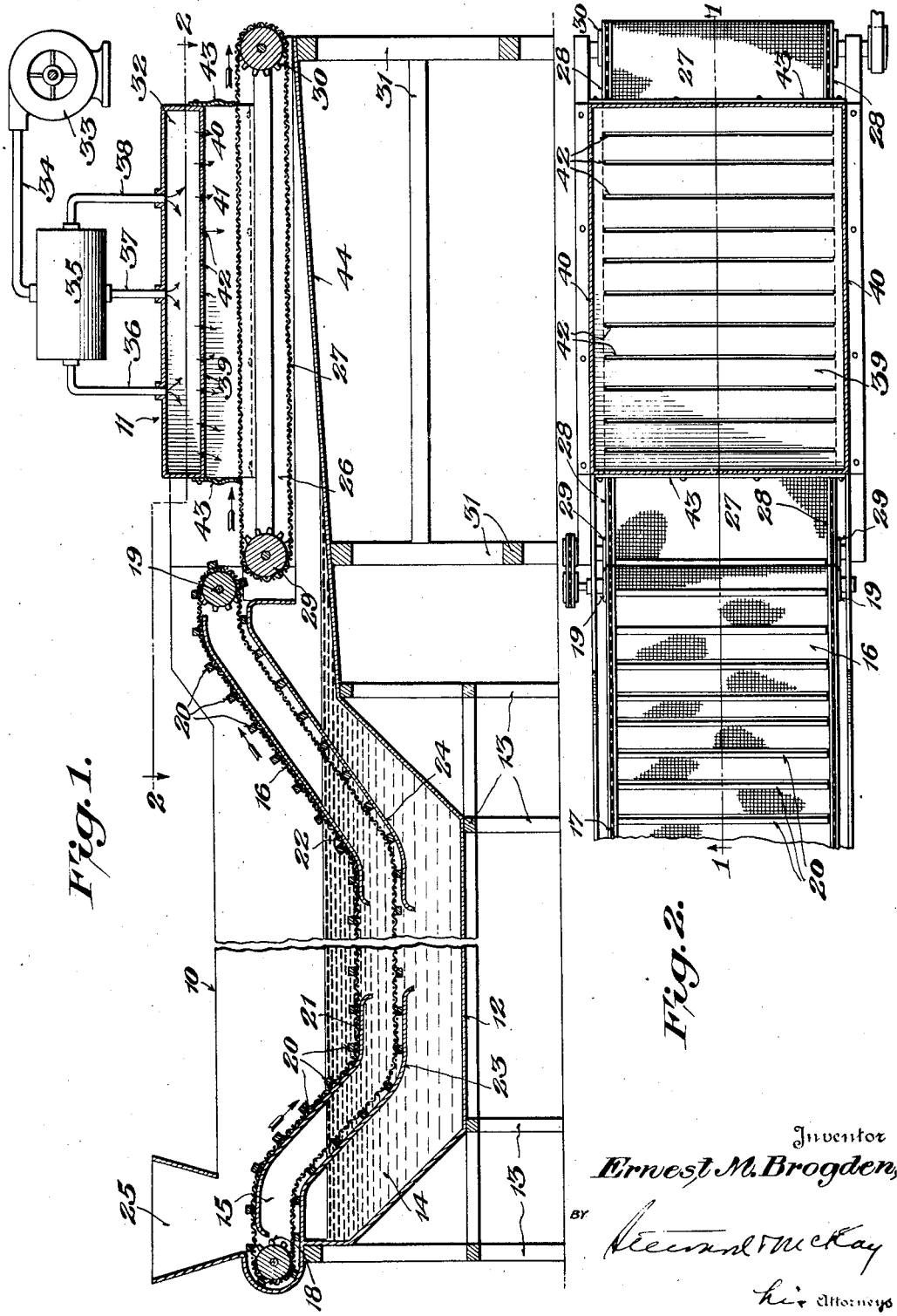

Patented Nov. 20, 1928.

1,692,286

UNITED STATES PATENT OFFICE.

ERNEST M. BROGDEN, OF SANTA MONICA, CALIFORNIA, ASSIGNOR TO BROGDEX COMPANY, OF WINTER HAVEN, FLORIDA, A CORPORATION OF FLORIDA.

PROCESS AND APPARATUS FOR FORMING A PROTECTIVE AND PRESERVATIVE COATING UPON FRUIT AND THE LIKE.

Application filed April 27, 1923, Serial No. 635,206. Renewed May 18, 1926.

This invention relates to a novel process and apparatus for forming a protective and preservative coating upon fruit and the like; and it has to do more particularly with the protective treatment of fresh fruit and the like which will prevent that relatively rapid deterioration of the fruit normally beginning almost immediately after its gathering and which will maintain the fruit for a relatively long period of time in its original fresh and sound marketable condition.

In earlier applications, I have described and claimed certain processes of and apparatus for treating fresh fruit, especially citrus fruit such as oranges, grape-fruit, tangerines and the like, by applying to the same a protective and preservative composition consisting chiefly of a waxy material, such as paraffin wax, associated with a solvent or liquid vehicle of oily character, either volatile or non-volatile, such as gasolene, benzine, light oils known as "white oils", medicinal oils, and the like; and by thoroughly rubbing or brushing the fruit to distribute the composition thereover in a thin film-like coating. It was found that the coating thus formed, consisting largely of the waxy material, partially sealed and protected the surface of the fruit to such an extent as to prevent withering or shrinkage of the fruit and infection by mold or rot fungi or other undesirable organisms, and in short to preserve the original fresh and sound marketable condition of the fruit for a long time. It is apparent that an important feature of the referred to methods and apparatus of my prior applications is the rubbing or brushing of the fruit to form the protective coating from the preservative material applied thereto. My present invention relates more particularly to the formation of a protective and preservative coating upon fruit by other than a rubbing or brushing action. My present invention is especially adapted, therefore, to the treatment of fruit which cannot conveniently or without injury thereto be subjected to a rubbing or brushing action. Grapes constitute a typical fruit of this character to the treatment of which my present invention is particularly adapted. In the detailed description given hereinafter of an explanatory example of the novel process and an illustrative embodiment of the novel apparatus of my invention serving to make clear its underlying principles, reference will therefore be made more particularly to the treatment of grapes.

A general object of my invention is, as has in effect already been stated, to form a protective and preservative coating upon fruit from suitable material applied thereto without any rubbing or brushing of the fruit.

Among other and more particular objects sought to be attained are ease and convenience of treatment and simplicity of the apparatus, all adapting the invention particularly to the treatment of the more delicately textured fruits, and economy and avoidance of waste in the utilization of the coating material.

Typical embodiments of the novel apparatus, exemplifying in their construction and operation when employed in carrying out my novel process of treating fruit, the fundamental principles of my invention and also offering important practical advantages particularly in the treatment of certain fruit of which grapes as hereinbefore stated may be taken as typical, are illustrated in the accompanying drawings, in which Figure 1 is a view in vertical longitudinal section, along the line 1—1 of Fig. 2, and with certain parts, not shown in Fig. 2, in elevation, of a form of the apparatus embodying an automatic fruit-feeding and dipping means;

Fig. 2 is a partial top plan and sectional view of the apparatus shown in Fig. 1, the section being taken on the line 2—2 of Fig. 1;

Fig. 3 is a view in vertical longitudinal section, along the line 3—3 of Fig. 4, and with certain parts, not shown in Fig. 4, in elevation, of another embodiment of the apparatus having a hand-operated means for dipping the fruit in the coating material to receive its initial supply from which the coating is formed; and Fig. 4 is a partial top plan and sectional view of the apparatus shown in Fig. 3, the section being taken on the line 4—4 of Fig. 3.

Broadly speaking, the invention contemplates applying to the fruit a fluent coating composition and then subjecting the fruit to a flowing fluid medium, air, for example, under sufficient pressure to thinly and uniformly spread the coating composition over its surface, to drive off excess of the composition, and to dry the spread composition, thereby causing the formation of a filmlike coating closely adhering to and entirely covering the surface of the fruit.

While in its broad scope the novel apparatus by which the process may be performed includes other composition-applying means, for example, operating to shower or spray the composition upon the fruit, the applying means preferably employed comprises a supply container for the fluent coating composition for dipping or immersing the fruit therein to receive its initial application of the composition.

Any composition of a freely fluent or liquid consistency suitable for the formation of the desired film-like protecting and preservative coating upon the fruit may be employed. The composition should include a sealing and water-proofing agent, desirably a wax or waxy material, substantially tasteless, odorless, indifferent chemically under the conditions of use and constituting a medium unfavorable to the development of fungoid or bacterial organisms, and a solvent or liquid vehicle therefor. The principal requirements for the solvent or liqiud vehicle are that it be fairly light and unobjectionable in its action upon the fruit. It may be of a volatile nature largely evaporating during the treatment of the fruit by the apparatus and leaving the fruit eventually covered with a thin film-like coating consisting substantially entirely of the sealing and water-proofing agent. Or, a solvent or liquid vehicle not of the volatile nature referred to may be employed, in which event it should also possess the fundamental characteristics mentioned above as required of the sealing and waterproofing agent. I have found, especially in treating such fruit as has hereinbefore been stated to be typified by grapes, that a satisfactory protective and preservative coating is formed upon the fruit by my novel apparatus employing a fluent coating composition composed of a mixture of paraffin wax and a colorless, tasteless, odorless and substantially non-volatile mineral oil derived from petroleum. Typical oils of this character, suitable for the purpose, are light mineral oils appearing on the market, and known as "white oils," medicinal oils and the like. In a typical instance of use of the composition in my novel apparatus, the mixture may comprise, by volume, from 10 to 15 parts of paraffin and from 90 to 85 parts of oil, the exact proportions being advantageously varied in accordance with the character of the fruit, temperature of operation, etc.

Referring first to the illustrative embodiment of the novel apparatus shown in Figs. 1 and 2:

In the illustrative apparatus 10 indicates generally the apparatus part or unit for initially applying fluent coating material to the fruit, and 11 indicates generally the apparatus part or unit functioning to form from the applied material the closely adhering film-like coating hereinbefore referred to. The two apparatus parts or units may conveniently be termed the applying unit and the finishing unit.

The applying unit 10 comprises a supply container 12 for the fluent coating material, supported upon a suitable framework 13. The container is of a capacity and arrangement to provide for a substantial body of the fluent coating material, indicated by the numeral 14, into which the fruit may be dipped to receive its initial application or supply of the material. Any suitable mechanical means may be employed for dipping the fruit in the coating material and delivering it with its adhering supply of that material to the unit 11 for the formation of the film-like coating, or those operations may be performed wholly by hand if desired. In the illustrative apparatus, endless traveling conveyor-means are employed, indicated generally by the numeral 15, having what may be termed an initial path of travel above the body of the fluent coating material to receive the fruit deposited thereon and successive advancing paths of travel downwardly into the fluent body of the material and horizontally therewithin to wholly immerse the fruit for a thorough application thereto of the material, and lastly upwardly therefrom and to a point of delivery to the unit 11 which receives the fruit and functions in the manner hereinafter to be described to form the protective and preservative coating from the supply of material adhering to the fruit. In the illustrative apparatus, the traveling conveyor-means includes a reticulated element, preferably a large mesh wire web as indicated at 16, constituting an open framework conveyor-surface particularly adapted to expose the bunches of grapes during their travel through the fluent coating material to ready contact therewith. The web 16 forming the conveyor-surface, is mounted upon two opposite-side sprocket chains 17 trained over two pairs of sprockets 18 and 19 journaled adjacent the receiving and discharge ends of the supply tank as shown. Bars 20 in parallel spaced relation are mounted upon and transversely of the web 16 to form cleats adapted to hold the bunches of grapes upon the web for transportation thereby. An upper and a lower pair of trackways 21, 22 and 23, 24, respectively, are provided with horizontal portions extending from the sprockets 16 and 17 and inclined portions to restrain the conveyor to its paths of movement in the supply container hereinbefore referred to. A hopper 25, disposed above the initial or receiving path of the conveyor, is provided for feeding the grapes thereto.

Important features of the finishing unit 11 for forming the coating upon the fruit from the fluent material supplied thereto include means for applying currents of a fluid medium, such as air, under pressure, to the fruit in such a manner as to blow excess of the fluent material therefrom and to distribute the remaining material uniformly over the surface of the fruit in a thin film-like covering, and means for supporting the fruit to enable the most efficient performance of the operations referred to. Preferably conveyor as well as supporting means are provided to transport the fruit through the finishing unit during the formation of the coating and preferably also means are provided to return the excess of coating material blown from the fruit to the supply container.

In the illustrative apparatus the fruit supporting and conveying means here referred to, indicated generally by the numeral 26, is of substantially the same construction as that of the conveyor-means employed in immersing the fruit, although advantageously the fruit supporting element of this conveyor may be web of larger mesh than that employed in the first described conveyor. Such a reticulated fruit-supporting element, consisting of a web of interlaced wires, is indicated at 27 mounted upon two opposite-side sprocket chains 28 trained about sprockets 29 and 30 mounted in the framework 31 of the apparatus. As shown in Fig. 1, the conveyor of the finishing unit here referred to is horizontally disposed with its receiving end immediately below the delivery end of the conveyor of the material-applying unit so that the fruit is delivered directly from the last mentioned to the first mentioned conveyor which transports the same in a horizontal path as indicated by the arrow in Fig. 1 to the point of discharge from the apparatus.

In the illustrative apparatus the means for applying currents of a gaseous medium, such as air, to the fruit to drive off excess of applied coating material and to form the closely adhering film-like coating from the material remaining thereon, includes an air-pressure chamber 32 mounted above the upper run of the conveyor 26, to which chamber air is supplied under pressure from the blower 33 through the conduit 34, the distributer head 35 and the distributer conduits 36, 37 and 38. The air-pressure chamber 32 is desirably of the elongated box-like formation shown, extending over a major portion of the length of the conveyor 26 although spaced from the receiving and delivery ends of that conveyor and overlapping the sides of the conveyor in its transverse dimension as shown in Fig. 2.

The lower wall or bottom 39 of the air-pressure chamber is horizontally disposed in spaced relation to and above the conveyor 26 by downward prolongation of the side walls 40 of the chamber which prolongations form its mounting upon the frame of the apparatus and also form the side walls of an air tunnel 41 encompassing the sides of the conveyor and through which the fruit is conveyed, the bottom of the chamber forming the roof of the tunnel. Slits 42 are formed in the bottom of the air-pressure chamber in a series extending lengthwise of the conveyor and with each slit running the width of the conveyor, to provide for a delivery of the air under pressure in substantial volume but directed in broad thin sheets or blasts downwardly into the air-tunnel and upon the fruit in transportation therethrough upon the conveyor. Flexible curtains or boots 43 attached to and depending from the end walls of the air-pressure chamber serve to prevent dissipation of the air currents outwardly through the ends of the tunnel while at the same time permitting ingress and egress of the fruit to and from the tunnel.

A pan 44 is mounted below the conveyor 26 upon the framework 31 in position inclined from the delivery end of the conveyor to the supply reservoir 12 to catch fluent coating material blown from the fruit and through the open framework conveyor as the fruit is being transported through the air-tunnel 41.

It is to be observed that by reason of the distributed supply of the air under pressure through the distributer conduits 36, 37 and 38 to the air-pressure chamber 32, the currents flowing therefrom are substantially uniform in intensity and that by reason of the closely spaced elongated slits the air is delivered in substantial volume but directed in thin sheets or blasts and directly downward upon the fruit. Such application of the fluid-pressure medium to fruit having an adhering supply of fluent coating material appears to be particularly effective in forming from the material a thin uniform film-like coating thereover.

The operation of the apparatus is a continuous one. The grapes are delivered through the hopper 25 to the conveyor 15 and thereby are conveyed through the fluent coating material in the supply tank and to the conveyor 26 of the finishing unit. By the last mentioned conveyor the grapes with a supply of the fluent coating material adhering thereto are transported through the air tunnel 41 where they are subjected to the air blasts in broad thin sheets issuing from the air pressure chamber 32 through the slits 42, the air thus directed in substantial volume and at high pressure against the fruit effectively thinning and uniformly distributing the supply of fluent coating material on the fruit and forming the desired closely adhering film-like coating.

Referring now to the illustrative embodiment of the novel apparatus shown in Figs. 3 and 4:

The finishing unit, indicated generally by the numeral 11' is identical throughout with that employed in the apparatus of Figs. 1 and 2. For that reason, further description thereof need not be given.

The applying-unit, of a different specific form from that of the apparatus of Figs. 1 and 2, is indicated generally by the numeral 10'.

The applying unit 10' comprises a supply container 12' for the fluent coating material, supported upon a suitable framework 13', the fluent coating material being indicated at 14'.

A fruit-containing basket, indicated generally by the numeral 45, is employed in this illustrative embodiment of the invention to immerse the fruit in the body of the fluent coating material, the basket to be thereafter hand-manipulated to withdraw the fruit from the supply of the coating material and to deposit the fruit upon the conveyor of the finishing unit. The basket comprises an open framework formed of U-shaped strips 46 of metal or other suitable rigid material and an upper rim 47 uniting the upper extremities of the strips. The upper extremities of the arms of the strips 46 adjacent the rim 47 extend laterally outwardly from the rim to form lugs 48 to seat and support the basket on the upper edge of the supply tank 12', with the basket depending downwardly within the tank and into the fluent coating material therein. A bail or handle 49 is provided for the hand-manipulation of the basket, and the basket is completed, as shown, by side and bottom walls of large mesh wire screening 50, mounted interiorly of and supported by the open framework referred to.

In the operation of the apparatus, the basket may first be filled with the fruit and then placed in the position shown in Fig. 3 to dip the fruit in the fluent coating material, or the basket may be placed in the position shown and the fruit deposited therein. After the fruit has been thus immersed, the basket is lifted out of the dipping tank and manipulated in an obvious manner to deliver the fruit therefrom upon the receiving end of the conveyor 26 of the finishing unit. The fruit thus delivered to the finishing unit is subjected to precisely the same treatment hereinbefore described and emerges with the desired uniform film-like coating thereon.

While reference has primarily been made in the foregoing description of my novel process of treating fruit and in the description of the novel apparatus here chosen to practice the process, to the treatment of grapes, it is to be understood that the process and the apparatus, either in the specific forms illustrated or in variations thereof within the scope of the invention, are adapted to the treatment of other fruit and also of some varieties of vegetables, where conditions of growing and marketing render desirable a protective and preservative treatment of this general character. As hereinbefore stated, the apparatus, when employed to practice the present process, is particularly adapted for the treatment of fruit requiring special care in handling and which fruit could not without extreme difficulty or injury thereto be rubbed or brushed to form the film-like coating from the applied composition. Grapes, as already stated, constitute merely a typical example of such fruit. Many varieties of vegetables upon which it may be desirable to form the protective and preservative coating in question come within the same category so far as the applicability of the invention to their treatment is concerned, and the term "fruit" as employed in the appended claims is used in a broad sense, unless otherwise indicated, to include them.

The novel process and apparatus are not only particularly applicable to the protective treatment referred to of those varieties of fruits and vegetables difficult of handling and upon which the coating cannot be formed by rubbing or brushing material applied thereto, but they present certain advantageous features in the treatment of fruit which may be thus rubbed or brushed if desired. Reference has hereinbefore been made to processes and apparatus of my prior applications for forming a protective and preservative coating of the general character here in question upon oranges and other citrus fruits by thoroughly rubbing or brushing the applied coating material over the surface of the fruit. In practice, horsehair brushes of the well known polisher-roll type are customarily used to perform that rubbing or brushing action upon the surface of the fruit necessary to form the coating by distribution of the coating material thereover, and in some cases, the brushing was continued after the formation of the coating to polish the coated fruit. In such operations a clogging of the brushes with excess of the coating material sometimes occurs, especially during a long continued run of the fruit, resulting in either an inefficient coating of the fruit or an impaired polish or both. The present invention is also applicable to the treatment of oranges and other citrus fruits and in such treatment avoids the objectionable feature mentioned as sometimes occurring in the prior treatment by one advantageous feature in particular, the uniform distribution of the applied fluent coating material over the surface of the fruit and the removal of excess therefrom by fluid-pressure means. The coating is thus formed upon the fruit without contact of brushes with the coating material and if a subsequent brushing is desired to give a polish to the fruit the formed coating does not contain that excess of coating material or material in that condition which clogs the brushes.

What I claim is:

1. Apparatus for treating fruit and the like comprising, in combination, means for applying coating material in fluent condition to a quantity of fruit, a support adapted to receive the fruit in spread condition thereover, and fluid-pressure means acting upon said fruit on said support to spread said applied fluent coating material over each fruit in a thin non-fluent adhering film-like coating.

2. Apparatus for treating fruit and the like comprising, in combination, mean for applying coating material in fluent condition to a quantity of fruit, a support adapted to receive the fruit in spread condition thereover, and fluid-pressure means acting upon said fruit on said support to thin the coating material on each fruit into a film-like coating.

3. Apparatus for treating fruit and the like comprising, in combination, means for applying a fluent coating material to the fruit, a traveling support adapted to freely support said fruit in spread condition thereon, and fluid-pressure means acting upon said fruit upon said support to uniformly distribute applied fluent coating material thereover and to blow excess of said material therefrom.

4. Apparatus for treating fruit and the like comprising in combination means for applying a fluent coating material to the fruit, conveyor means adapted to receive fruit with fluent coating material applied thereto and to deliver said fruit to a point of discharge while freely gravity-supporting said fruit, and fluid-pressure means acting upon said fruit on said conveyor to uniformly distribute said fluent coating material thereover.

5. Apparatus for treating fruit and the like comprising, in combination, a supply tank for dipping fruit in a fluent coating material, an open-framework support for fruit adjacent thereto, and adapted to receive fruit with fluent coating material applied thereto, and means supplying currents of air against said fruit upon said support.

6. Apparatus for treating fruit and the like comprising, in combination, a supply container for fluent coating material adapted for dipping the fruit for application of said composition thereto, an open framework support for fruit adjacent said container, means supplying and directing air currents downwardly upon said support and means beneath said support for catching and returning coating material to said container.

7. Apparatus for treating fruit and the like comprising, in combination, a supply container for a fluent coating material adapted for dipping the fruit in quantity therein for application of said material to each fruit, supporting means adjacent said supply container adapted to receive in a spread condition the fruit delivered from said supply container and means for directing air blasts against said fruit on said support for blowing excess coating material therefrom.

8. Apparatus for treating fruit and the like comprising, in combination, a fruit dipping tank containing a fluent coating material, a reticulated conveyor to receive dipped fruit and to convey same to a point of discharge, and means for creating and directing air currents downwardly upon said conveyor.

9. Apparatus for treating fruit and the like comprising, in combination, a fruit dipping tank containing a fluent coating material, a reticulated conveyor to receive dipped fruit and to convey same to a point of discharge, means for creating and directing air currents downwardly upon said conveyor, and a drip pan beneath said conveyor and adapted to return fluent coating material to said tank.

10. Apparatus for treating fruit and the like comprising, in combination, means for applying a fluent coating material to the fruit and means for directing air under pressure in sheet-like blasts against the fruit having said coating material applied thereto.

11. Apparatus for treating fruit and the like comprising, in combination, a reticulated conveyor, means for applying a fluent coating material to the fruit and means for delivering the fruit to said conveyor, an air pressure chamber mounted above said conveyor, means for supplying air under pressure thereto, said air pressure chamber having a lower wall opposed to said conveyor and provided with air delivery slits.

12. Apparatus for treating fruit and the like comprising, in combination, a reticulated conveyor, means for applying a fluent coating material to the fruit and means for delivering the fruit to said conveyor, said conveyor being arranged to transport fruit with fluent coating material applied thereto to a point of discharge from the apparatus, an air pressure chamber mounted above said conveyor in the path of movement of said fruit to its point of discharge, means for supplying air under pressure to said chamber, said chamber having a bottom opposed to said conveyor and provided with air delivery slits arranged in a series extending in the direction of the path of movement of said fruit on said conveyor and with each slit extending transversely of said path of movement.

13. The process of treating fruit and the like which comprises applying coating material in a fluent condition to the fruit and then directing a stream of a gaseous medium against the fruit to spread the applied material thereover.

14. The process of treating fruit and the like which comprises applying coating material in a fluent condition to the fruit and then directing a stream of a gaseous medium under pressure against the fruit to spread the applied material thereover.

15. The process of treating fruit and the like which comprises applying coating material in a fluent condition to the fruit and then directing a stream of a gaseous medium against the fruit under sufficient pressure to drive off a portion of the material and to spread the remainder of the material over the surface of the fruit.

16. The process of treating fruit and the like which comprises applying coating material in a fluent condition to the fruit and then blowing air against the fruit to spread the applied material thereover.

17. The process of treating fruit and the like which comprises applying coating material in a fluent condition to the fruit and then blowing air against the fruit under sufficient pressure to drive off a portion of the material and to spread the remainder of the material over the surface of the fruit.

18. The process of treating fruit and the like which comprises dipping the fruit in a body of coating material in fluent condition and then directing a stream of a gaseous medium against the fruit to spread the adhering material thereover.

19. The process of treating fruit and the like which comprises dipping the fruit in a body of coating material in fluent condition and then directing air streams against the fruit to uniformly spread the adhering coating material thereover.

20. The process of treating fruit and the like which comprises dipping the fruit in a body of coating material in fluent condition and then blowing air against the fruit under sufficient pressure to spread the adhering coating material thereover and to drive off excess of the material.

21. Apparatus for treating fruit and the like comprising a tank, a submerging device operative therein, a reticulated belt draining support, and means for returning drip from said support to said tank.

22. Apparatus for treating fruit and the like comprising a tank, a submerging device operative therein, a draining support, means for directing a gaseous medium forcibly upon said support, and means for returning drip from said support to said tank.

In testimony whereof I hereunto affix my signature.

ERNEST M. BROGDEN.